(12) United States Patent
Saxonberg et al.

(10) Patent No.: US 10,904,285 B1
(45) Date of Patent: Jan. 26, 2021

(54) DOCUMENT SANITIZATION

(71) Applicant: CA, Inc., San Jose, CA (US)

(72) Inventors: Jordan Saxonberg, Los Angeles, CA (US); Joe H. Chen, Manhattan Beach, CA (US)

(73) Assignee: CA, Inc., San Jose, CA (US)

( * ) Notice: Subject to any disclaimer, the term of this patent is extended or adjusted under 35 U.S.C. 154(b) by 162 days.

(21) Appl. No.: 16/143,019

(22) Filed: Sep. 26, 2018

(51) Int. Cl.
*G06F 12/14* (2006.01)
*H04L 29/06* (2006.01)
*G06F 21/56* (2013.01)
*G06F 3/0484* (2013.01)
*G06F 40/166* (2020.01)

(52) U.S. Cl.
CPC ........ *H04L 63/145* (2013.01); *G06F 3/04847* (2013.01); *G06F 21/568* (2013.01); *G06F 40/166* (2020.01); *G06F 2221/032* (2013.01)

(58) Field of Classification Search
CPC ... G06F 21/568; G06F 21/6209; H04L 63/145
USPC ........................................................ 726/23
See application file for complete search history.

(56) References Cited

U.S. PATENT DOCUMENTS

| | | | |
|---|---|---|---|
| 2013/0145471 A1* | 6/2013 | Richard | G06F 21/562 726/24 |
| 2017/0295192 A1* | 10/2017 | Hutton | G06F 21/64 |
| 2017/0353475 A1* | 12/2017 | Hutton | G06F 21/56 |
| 2019/0108338 A1* | 4/2019 | Saxe | G06F 21/565 |

OTHER PUBLICATIONS

Venkatesan et al, Efficient Techniques for Document Sanitization, ACM, Oct. 30, 2008, pp. 843-852.*
Bonomi et al, An Information-Theoretic Approach to Individual Sequential Data Sanitization, ACM, pp. 337-346.*

* cited by examiner

*Primary Examiner* — Alexander Lagor
*Assistant Examiner* — Jenise E Jackson
(74) *Attorney, Agent, or Firm* — Shook, Hardy & Bacon L.L.P.

(57) ABSTRACT

In one embodiment, a method for electronic document sanitization may include receiving a first request from a client device to send a first electronic document, the first request including a requested usability level of the first electronic document, removing at least one document object from the first electronic document, the document object having potentially malicious content, the removing based at least in part on receiving the first request, and transmitting the first electronic document to the client device after removing the at least one document object therefrom.

12 Claims, 6 Drawing Sheets

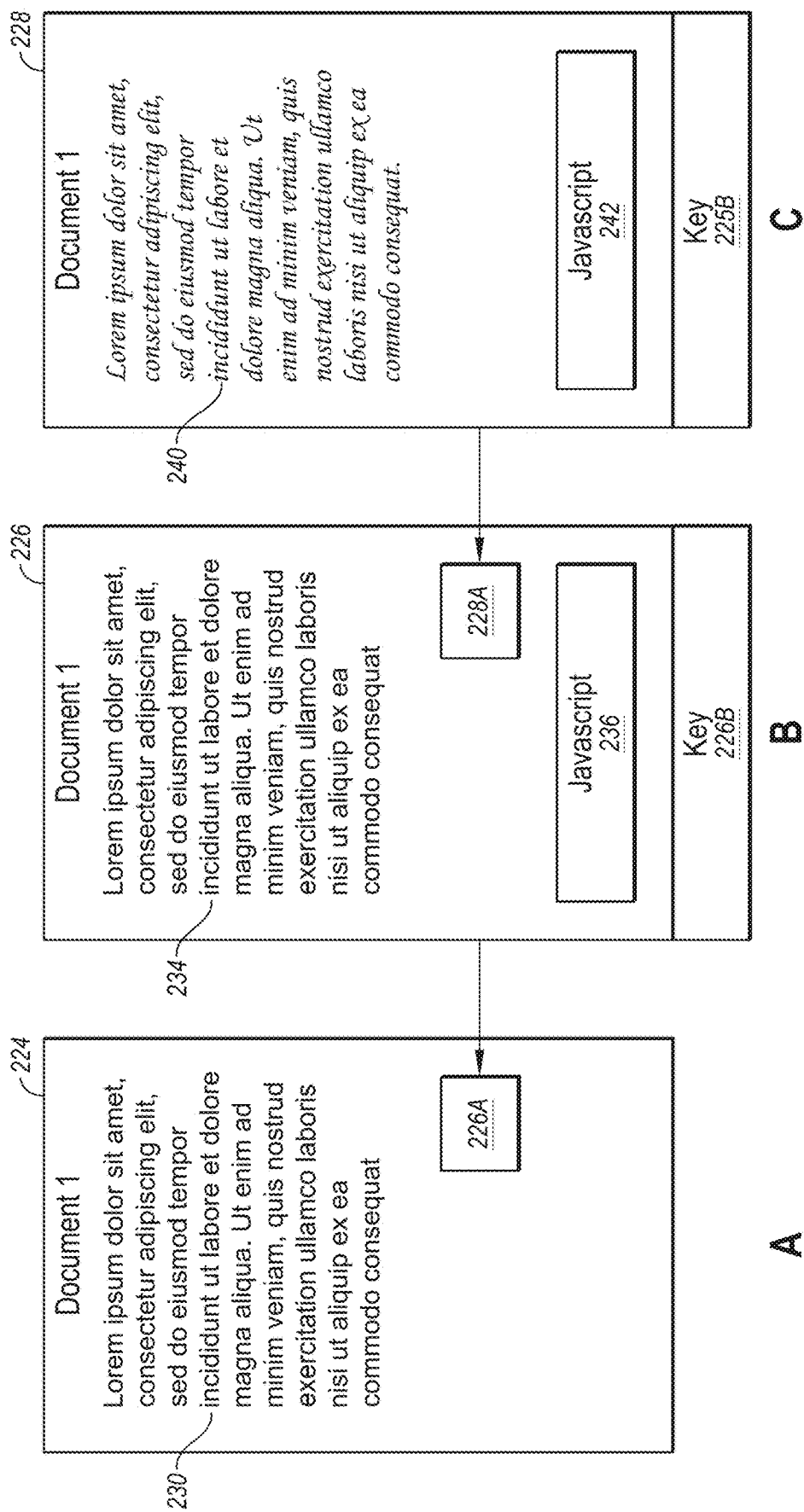

DOCUMENT SANITIZATION

BACKGROUND

Content disarm and reconstruction (CDR) technologies remove active content and potentially exploitable content from documents, as well as potentially regenerate a new document version for a user in order to eliminate or reduce the attack surface of a document. Removing the potentially exploitable content, however, may result in a document that may be capable of being rendered, but may also make the document effectively unusable for practical purposes.

The subject matter claimed herein is not limited to embodiments that solve any disadvantages or that operate only in environments such as those described above; rather, this background is only provided to illustrate one example technology area where some embodiments described herein may be practiced.

SUMMARY

In one embodiment, a computer-implemented method for document sanitization may be performed, at least in part, by a computing device comprising one or more processors. The method may include receiving a first request from a client device to send a first electronic document, the first request including a requested usability level of the first electronic document, removing at least one document object from the first electronic document, the document object having potentially malicious content, the removing based at least in part on receiving the first request, and transmitting the first electronic document to the client device after removing the at least one document object therefrom.

In some embodiments, the method may include receiving a personalized risk profile related to the first electronic document, wherein the personalized risk profile defines a first desired malware risk level and a user selected usability level. In some embodiments, removing the at least one document object may further include removing at least one default document object from the first electronic document, the default document object being predetermined by an administrator.

In some embodiments, the method may further include determining a default malware risk level, and removing a plurality of document objects from the first electronic document until the default malware risk level is satisfied. In some embodiments, removing the at least one document object may further include removing at least one of a font, a script, an embedded object, a linkable object, or a combination thereof.

In some embodiments, a computer-implemented method for document sanitization may be performed, at least in part, by a client computing device comprising one or more processors. The method may include selecting, on a user interface on the client computing device, a first desired malware risk level for a first electronic document, selecting, on the user interface on the client computing device, a first desired usability level for the first electronic document, requesting, from a remote computing device, the first electronic document having the first desired malware risk level and the first desired usability level, and receiving, from the remote computing device, the first electronic document having the first desired malware risk level and the first desired usability level.

The method may further include requesting, based on receiving the first electronic document, a second electronic document, the second electronic document having a second desired malware risk level and a second desired usability level. In some embodiments, selecting the first desired malware risk level for the first electronic document and selecting the first desired usability level for the first electronic document further includes interacting with a slider on the user interface, wherein moving the slider towards a first end selects a higher desired malware risk level and a higher desired usability level, and wherein moving the slider towards a second end opposite the first end selects a lower desired malware risk and a lower desired usability level.

In some embodiments, selecting the first desired malware risk level for the first electronic document further includes selecting a lower malware risk level, and receiving, from the remote computing device, the first electronic document having a number of document objects removed that satisfies a higher malware risk level threshold. Selecting the first desired malware risk level may further include selecting a higher malware risk level and receiving, from the remote computing device, the first electronic document having a number of document objects removed that satisfies a lower malware risk level threshold. Selecting the first desired usability level for the first electronic document may further include selecting at least one document object to be removed from the first electronic document from an interactive list displayed on the user interface.

Also, in some embodiments, one or more non-transitory computer-readable media may include one or more computer-readable instructions that, when executed by one or more computing devices, cause the one or more computing devices to perform a method for document sanitization.

It is to be understood that both the foregoing summary and the following detailed description are explanatory and are not restrictive of the invention as claimed.

BRIEF DESCRIPTION OF THE DRAWINGS

Embodiments will be described and explained with additional specificity and detail through the use of the accompanying drawings in which:

FIGS. 2A-2C illustrate various embodiments of document sanitization;

DETAILED DESCRIPTION

Currently CDR technologies do not attempt to identify or classify malicious content in a document, but rather remove all content that may be potentially malicious. Users are thus presented with modified documents having all of the potential risks removed. However, the resulting document which may not be sufficiently useable and may therefore entail a significant cost to user productivity.

In addition, current CDR technologies may use a quarantine mechanism to store a copy of the original, unmodified document on a server or on an on-disk endpoint quarantine. The secure quarantine may be used for backing up and retrieving the original file when the sanitized version of the document is deemed unusable by the user. However, storing all of the documents creates a larger, central storage burden and requires the user to access the quarantine, find the correct document, and then restore the document. Furthermore, with current CDR technologies, multiple versions of the document may be created, requiring the user to sort through the different versions of the documents to find a document that is sufficiently useable. Current CDR technologies may be so unusable that users may turn off CDR features due to the negative usability impact.

In contrast, the system and methods described herein provide a solution which enables a user to recover a usable backup of the original file, while minimizing risks. The level of desired usability may vary from user to user, and thus different levels of risk may be specified by each user to fit his needs, with the user able to request increasingly usable versions, but riskier versions, of the documents as needed. In some embodiments, the original file may be obtained through the permission of an administrator, who may provide an encryption key to decrypt the original document. In some embodiments, an encrypted version of an original document may be embedded in the sanitized document, where the administrator may provide the user with an encryption key to access the original document, if needed. Thus, a separate quarantine storage may not be needed.

Figure 1:
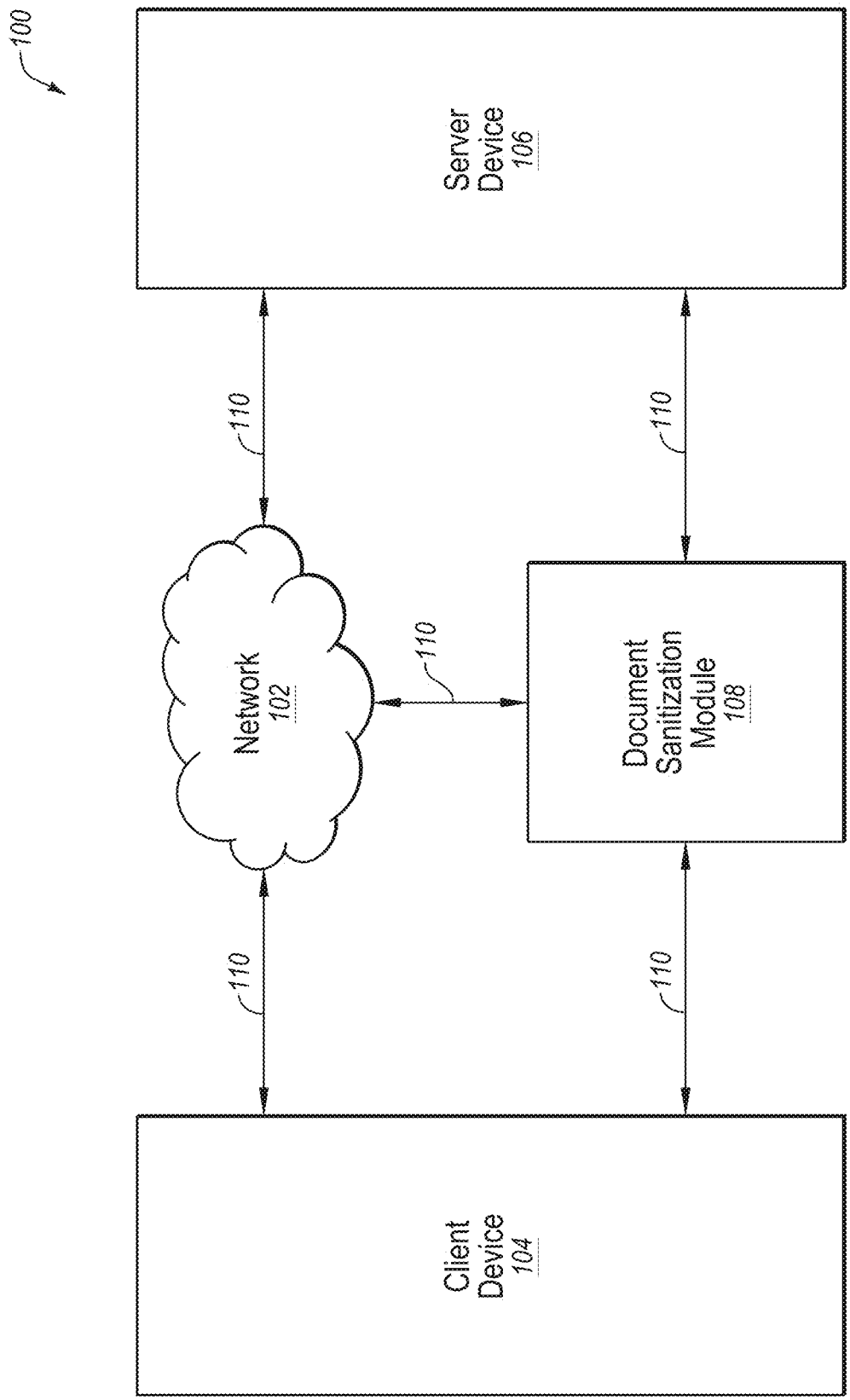
FIG. 1 illustrates an example system configured for document sanitization.

Turning to the figures, FIG. 1 illustrates an example system configured for document sanitization. The system 100 may include a network 102, a client device 104, a server device 106, and a document sanitization module 108. In some embodiments, the document sanitization module 108 may execute on a standalone device that communicates with the client device 104 and the server device 106. In other embodiments, however, the document sanitization module 108 may be part of the client device 104 and/or the server device 106.

In some embodiments, the network 102 may be configured to communicatively couple the client device 104, the server device 106, and the document sanitization module 108 by way of communication links 110. In some embodiments, the network 102 may be any wired or wireless network, or combination of multiple networks, configured to send and receive communications between systems and devices. In some embodiments, the network 102 may include a Personal Area Network (PAN), a Local Area Network (LAN), a Metropolitan Area Network (MAN), a Wide Area Network (WAN), a Storage Area Network (SAN), the Internet, or some combination thereof. In some embodiments, the network 102 may also be coupled to, or may include, portions of a telecommunications network, including telephone lines, for sending data in a variety of different communication protocols, such as a cellular network or a Voice over IP (VoIP) network.

Figure 4:
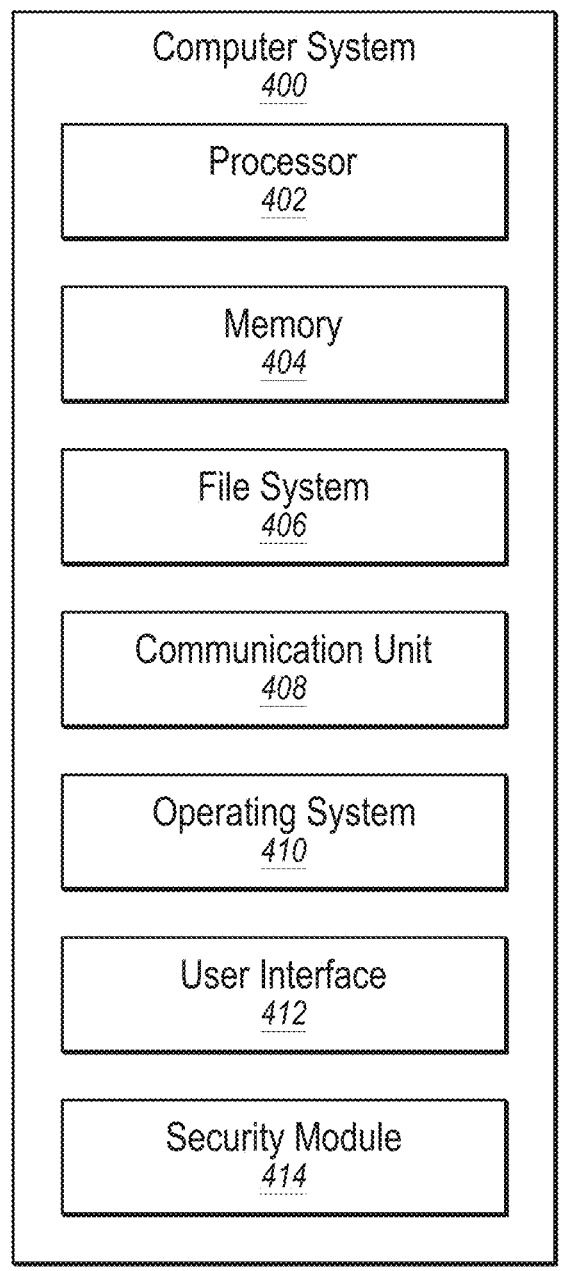
FIG. 4 illustrates an example computer system that may be employed in document sanitization.

In some embodiments, the client device 104 may be any computer system capable of communicating over the network 102 and capable of document sanitization, examples of which are disclosed herein in connection with the computer system 400 of FIG. 4. Similarly, in some embodiments, the server device 106 may be any computer system capable of communicating over the network 102 and capable of document sanitization, examples of which are disclosed herein in connection with the computer system 400 of FIG. 4. The document sanitization module 108 may execute on a standalone device, examples of which are described with respect to the client device 104 and the server device 106, or the document sanitization module 108 may execute on the client device 104 and/or the server device 106.

In some embodiments, the document sanitization module 108 may be implemented in conjunction with any application including Symantec Security Technology and Response (STAR) technology, Symantec's Email Gateway Security (SMG), Symantec's Endpoint Protection (SEP, Norton Security, Symantec's Web Isolation Fireglass technology, etc.

In some embodiments, the document sanitization module 108 may enable configurable risk profiles which enable users to select a risk-to-usability ratio that best suits the user's needs. Instead of having a one-size-fits-all sanitization process, each risk profile may be configured to remove only categories of content that are not allowed by the selected risk profile. For example, potentially malicious content may be found in scripts, macros, fonts, external content, embedded objects, etc. The range of selectable risk profiles may be provided to the user on a sliding scale, ranging from high risk/low impact to low risk/high impact. Risk profiles are described in further detail with respect to FIG. 2A.

In some embodiments, a secure quarantine for backing up and retrieving an original file may be contemplated when a sanitized version of the document is deemed unusable by the user. Thus, the document sanitization module 108 may attach or embed an encrypted copy of an original document into a sanitized version of the document sent to a user. If the user desires the original document, an administrator may approve sending the encryption key to the user. Encrypted attachments are described in further detail with respect to FIG. 2B.

In some embodiments, the risk profile embodiment and the quarantine embodiment may be combined. More specifically, the user may select a risk profile and receive multiple versions of sanitized documents nested within the document received when selecting the risk profile. As described previously, the document received by the user may initially contain only the elements allowed by the selected risk profile; however, the received document may contain at least one attachment that includes an encrypted version of the original document. In other embodiments, multiple encrypted versions of the document may be embedded within each respective version, such that a number of encryption keys may be requested to decrypt each version of the original document. Risk profile documents containing encrypted attachments are described in further detail with respect to FIG. 2C.

Modifications, additions, or omissions may be made to the system 100 without departing from the scope of the present disclosure. For example, in some embodiments, the system 100 may include additional components similar to the components illustrated in FIG. 1 that each may be configured similarly to the components illustrated in FIG. 1. Also, the document sanitization module 108 may execute on the client device 104, the server device 106, or may execute on another device not illustrated in FIG. 1.

Figure 2A:
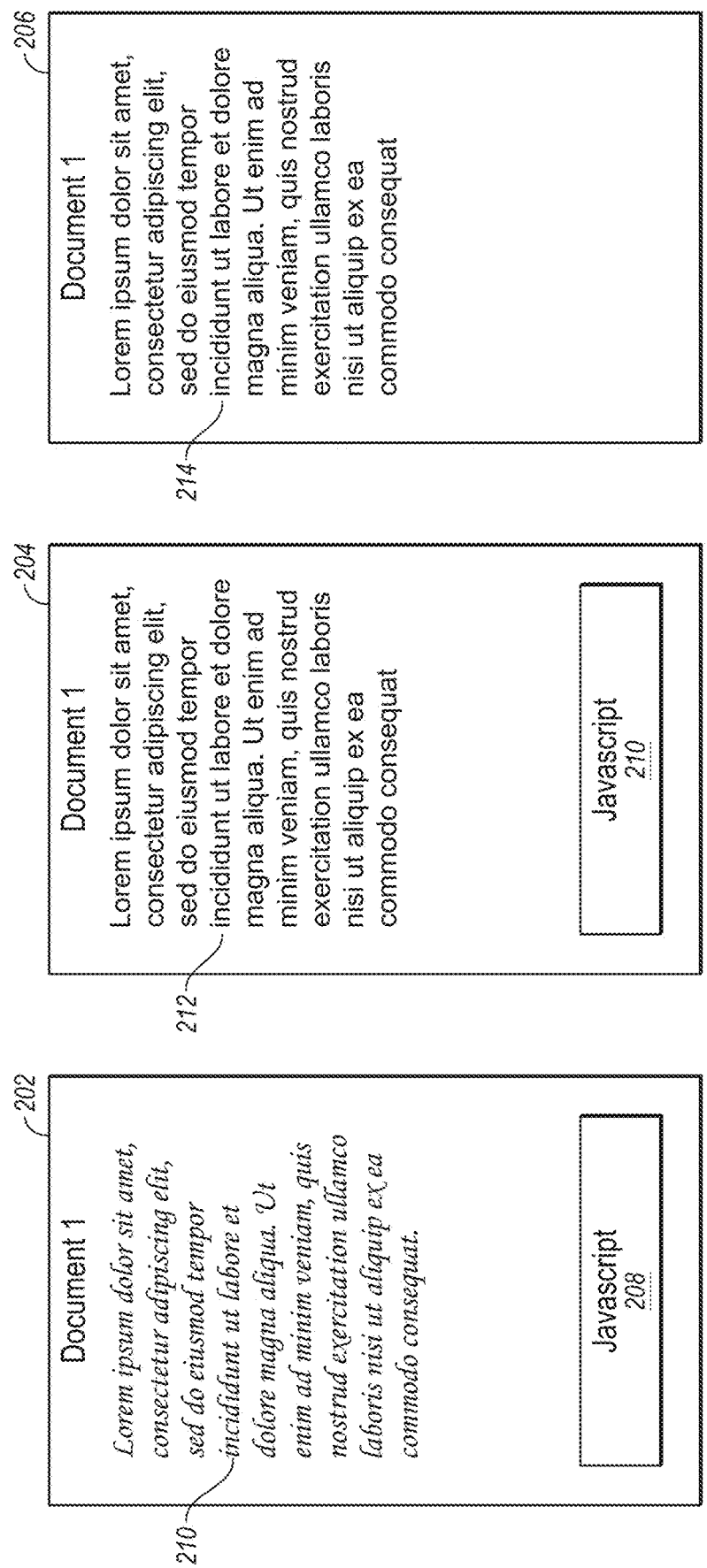

FIG. 2A illustrates variations of an example embodiment of document sanitization.

Documents may contain any number of elements that contain or are subject to malicious content. For example, malicious content may be associated with scripts, macros, fonts, linkable content, embedded objects, etc. In one embodiment, a user may want access to a document, but does not want the document to be completely stripped of all content that could potentially contain malicious content. Thus, the user may select a personalized risk profile that determines how much, or what type, of the content may be removed before the document is provided to the user.

In one example, a document 202 may be a document in its original form containing potentially malicious content. In one embodiment, the document 202 may contain text displayed in a font 210. The font 210 may be, for example, a TrueType or HTML font which may enable the execution of malicious code. In addition, the document 202 may contain a script, such as a JavaScript object 208, which may also enable the execution of malicious code. The user may want to retrieve the document 202, and is given the option to select a risk profile, where the selected risk profile determines how much of the document is sanitized before the document is sent to the user.

Table 1 shows an example of profiles defined by risk versus impact.

TABLE 1

| Profile | Risk | Usability Impact | Example Categories Modified |
|---|---|---|---|
| Disabled | Very high | Zero | None |
| Light | High | Very low | Remove external content dependencies/links |
| Normal | Low | Medium | Remove scripts and macros |
| Deep | Near zero | Very high | Remove content used in exploits (fonts, etc.) |

At one end of the scale, selection of the "disabled" risk profile may disable all content sanitization. Thus, the document will be delivered to the user in its original form without utilizing document sanitization methods. The risk of there being malicious content is very high, as no potentially malicious content has been removed and none of the content has been modified. On the other hand, the user is not impacted by the sanitization, and there is no impact on the usability of the document.

If, for example, the user has selected a "light" risk profile, the document 204 may be delivered to the user. The "light" risk profile, for example, may have removed the TrueType font 210, and text 212 of the document 204 may be a plain text font, and thus may not (or may be less likely to), contain executable malicious content. However, the "light" risk profile may not remove the JavaScript object 208. Thus, the user is impacted in some degree; however, the usability impact remains low. On the other hand, the risk of malicious content remains high, as malicious content may be present in the JavaScript object 210.

At the other end of the scale, the user may select a "deep" risk profile which removes all potentially malicious content, including fonts, scripts, links, macros, attachments, objects, etc. For example, the document 206 may be delivered to a user that selected a "deep" risk profile, with the document 206 having all objects and scripts removed, and having only a plain text font 214 displayed on the document 206. The risk for a "deep" risk profile is virtually zero, as any element that may contain malicious material is removed. On the other hand, the impact on the user's ability to use the document may drop significantly and, in some cases, the document 206 may not be very useful for the user.

Although four example profiles are provided in Table 1, any number of risk profiles may be provided from which the user may make a selection from a sliding scale. In one embodiment, the user may be presented with a slider, where the user may slide a graphic presented on a graphical user interface in order to select a risk profile from a pre-determined set of profiles. The pre-determined set of risk profiles may be created and/or maintained by an administrator. In a slider example, each risk profile may be associated with a default selection of elements that may be or may not be removed from the document, with one end of the scale representing lowest-risk/lowest-usability and the other end of the scale representing highest-risk/highest-usability. In another embodiment, the user may be presented with an interactive graphic (e.g., interactive checkboxes on a list) to select which elements the user wants or can do without. For example, the user may create a custom profile that removes all fonts and scripts but maintains attachments by selecting from a number of checkboxes associated with items on a list.

Once the user receives the sanitized document, the user may continue to select a risk profile until a document is created and/or returned that meets the user's usability needs while still minimizing the amount of potential risk. In another embodiment, an administrator may select the risk profile for the user. If the user reports usability issues, then the administrator may continue to select the next highest risk profile version of the document, until the user is given access to the original, full risk document.

Figure 2B:
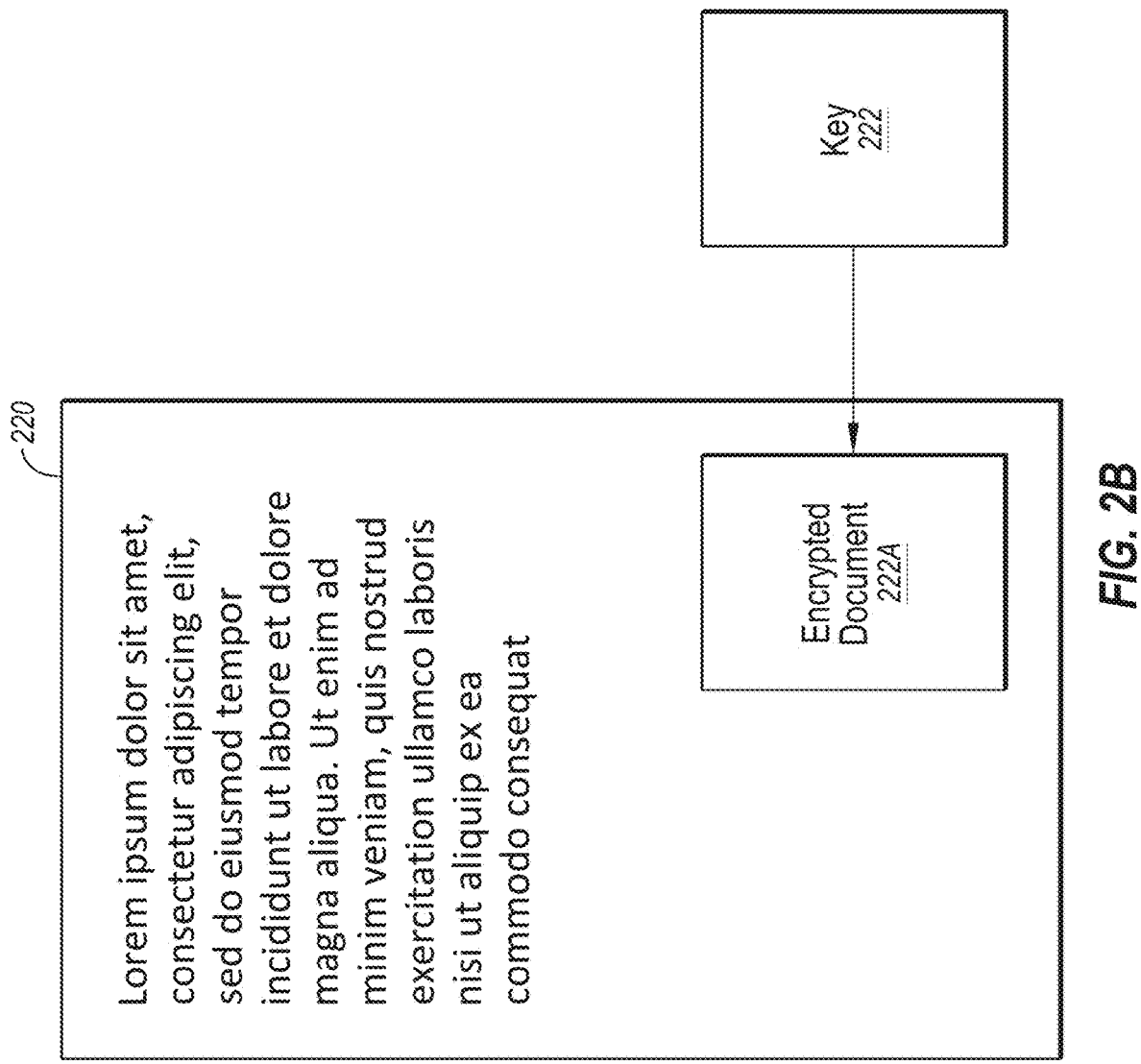

FIG. 2B illustrates an example embodiment of document sanitization. In particular, a user interacting with the client device 104 may request a document from, for example, the server 106. As opposed to the embodiment described with reference to FIG. 2A, the user is provided with the document 220, which has already been through a pre-determined sanitization process. The pre-determined process may include a default set of elements that are removed from any document requested by the user. For example, in this embodiment, the first version of the document 220 may be sent to the user with all potentially malicious elements sanitized from the document, including fonts, scripts, macros, and attachments removed.

In addition, a self-contained backup of the original document may be attached to or embedded within the sanitized document 220. The self-contained backup may be an encrypted version 222A of the original document, and this may be an unmodified version of the original document. In one embodiment, the encrypted version 222A may be encrypted by asymmetric or symmetric cryptography; however, in the described embodiment, the encrypted version 222A of the document is encrypted using symmetric (e.g., private-key) cryptography.

In this example embodiment, a symmetric encryption key (such as encryption key 222) may be generated at the time document 222A is requested from the user. The original document may be encrypted using encryption key 222 and embedded in document 220. The encryption key 222 may be saved by an administrator, and may not be immediately known to the user to receive the sanitized document 220. If the sanitized document 220 proves to be unusable to the user, and access to the original document is requested, the user may request permission from the administrator to access the original document which is embedded or attached to the sanitized document 220. If the administrator approves the request, the administrator may send the encryption key 222 to the user for the user to decrypt and access the encrypted document 222A.

In the embodiment described with reference to FIG. 2B, additional server storage or user access to a quarantine server may not be needed because the original document is provided with the sanitized document.

FIG. 2C illustrates an example embodiment of document sanitization. At A, the user has requested a document using the embodiments described with reference to risk profiles. For example, the user may have selected the "deep" risk profile and, in return, has received a sanitized document 224 which does not include scripts, macros, embedded objects, etc., and which is displayed using a plain text font 230. In contrast to the embodiments described with reference to FIG. 2A, however, the sanitized document 224 also contains an encrypted version 226A of a document 226. The document 226 may be associated with a riskier profile setting, such as the "normal" risk profile setting. As a result, the document 226 may be displayed using a plain text font 234, but may contain at least one JavaScript object 236. In addition, the document 226 may be associated with, and/or may contain, an encryption key 226B.

Furthermore, the sanitized document 226 may also include an encrypted version 228A of a document 228. The document 228 may be associated with the next riskier profile setting (from that profile setting of the document 226); for example, the document 228 may be associated with the "light" risk setting profile. In another example, the document 226 may be the original, unsanitized document. Thus, the document 228 may have a TrueType or HTML font 240, may contain a JavaScript object 242, and may contain other embedded objects or attachments, or other potentially malicious content. The document 228 may further be associated with and/or contain an encryption key 228B.

Upon selecting the risk profile and receiving the document 224, the user may determine that the document 224 is not sufficiently usable, and thus may request the encryption key 226B from the administrator. If the administrator approves the request, the user may receive the encryption key 226B which may be used to decrypt and access the document 226, where the document 226 is embedded into the document 224. Upon accessing the document 226, the user may determine that the document 226 is not sufficiently usable, and thus may request the encryption key 228B from the administrator. If the administrator approves the request, the user may receive the encryption key 228B which may be used to decrypt and access the document 228, where the document 228 is embedded in the document 226.

In some embodiments, the user may only obtain an encryption key for each risk profile version of the document at a time, which forces the user to try each successive level of risk before resorting to the full risk, original document.

Modifications, additions, or omissions may be made to the document sanitization of FIGS. 2A-2C without departing from the scope of the present disclosure.

Figure 3:
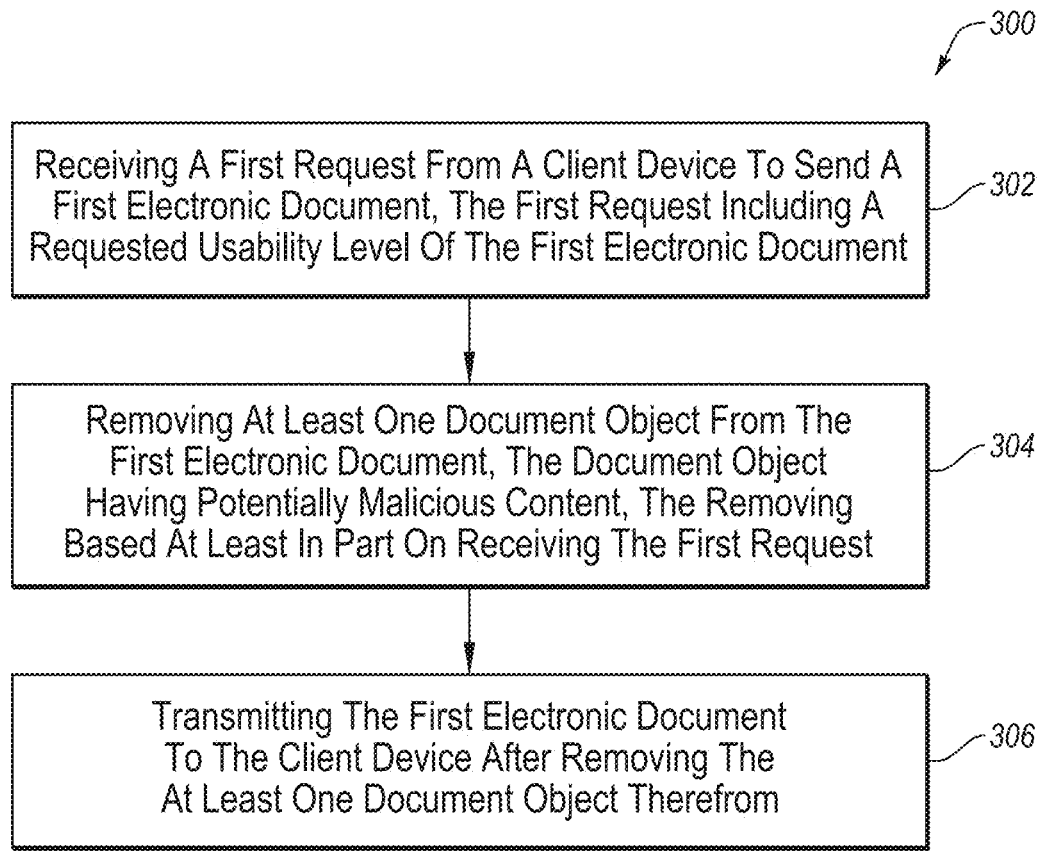
FIG. 3 illustrates a flowchart of an example method for document sanitization.

FIG. 3 is flowchart of an example method 300 for document sanitization. The method 300 may be performed, in some embodiments, by a device, module, and/or system, such as by the client device 104, the server device 106 and/or the document sanitization module 108 executing on one of these devices or on another device. In these and other embodiments, the method 300 may be performed by one or more processors based on one or more computer-readable instructions stored on one or more non-transitory computer-readable media. The method 300 will now be described in connection with FIGS. 1, 2A-2C, and 3.

The method 300 may include, at action 302, receiving a first request from a client device to send a first electronic document, the first request including a requested usability level of the first electronic document. For example, the server device 106 may receive the request over the network 102 from the client device 104. In some embodiments, the server device 106 may transmit the request to the document sanitization module 108. In other embodiments, the document sanitization module 108 may receive the request from the client device 104, and may communicate with server device 106 to obtain information needed to perform the methods described here.

The method 300 may include, at action 304, removing at least one document object from the first electronic document, the document object having potentially malicious content, the removing based at least in part on receiving the first request. For example, the document sanitization module 108 may determine how many and which document objects should be removed in order to obtain a desired or predetermined (e.g., default) risk and/or usability level associated with the document, and then the document sanitization module 108 may remove the determined document objects.

The method 300 may include, at action 306, transmitting the first electronic document to the client device after removing the at least one document object therefrom. For example, either the server device 106 or the document sanitization module 108 may transmit the sanitized document to the client device 104 after one or more document objects have been removed from the original document in order to reduce the presence of potential malware within the document.

Although the actions of the method 300 are illustrated in FIG. 3 as discrete actions, various actions may be divided into additional actions, combined into fewer actions, reordered, expanded, or eliminated, depending on the desired implementation.

Further, it is understood that the method 300 may improve the functioning of a computer system itself. For example, the functioning of the document sanitization module 108 executing on the client device 104 or the server device 106 may itself be improved by the method 300. For example, the document sanitization module 108 may be improved by more efficiently and more accurately determining how to provide the user a document that is sufficiently usable while minimizing the potential presence of malware. With each request and sanitization, the system and method may improve knowledge regarding which elements should be removed and which should remain in order to minimize risks and maximize usability.

Also, the method 300 may improve the technical field of document sanitization. As described herein, users may be able to use the described document sanitization system and method to request and receive a document that is still efficient in terms of potential productivity, while removing potential malware issues from elements and objects that the user does not need or can do without.

FIG. 4 illustrates an example computer system that may be employed in document sanitization. In some embodiments, the computer system 400 may be part of any of the systems or devices described in this disclosure. For example, the computer system 400 may be part of any of the client device 104, the server device 106, and/or the document sanitization module 108 of FIG. 1.

The computer system 400 may include a processor 402, a memory 404, a file system 406, a communication unit 408, an operating system 410, a user interface 412, and a module 414, which all may be communicatively coupled. In some embodiments, the computer system may be, for example, a desktop computer, a client computer, a server computer, a mobile phone, a laptop computer, a smartphone, a smartwatch, a tablet computer, a portable music player, a networking device, or any other computer system.

Generally, the processor 402 may include any suitable special-purpose or general-purpose computer, computing entity, or processing device including various computer hardware or software modules and may be configured to execute instructions stored on any applicable computer-readable storage media. For example, the processor 402 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data, or any combination thereof. In some embodiments, the processor 402 may interpret and/or execute program instructions and/or process data stored in the memory 404 and/or the file system 406. In some embodiments, the processor 402 may fetch program instructions from the file system 406 and load the program instructions into the memory 404. After the program instructions are loaded into the memory 404, the processor 402 may execute the program instructions. In some embodiments, the instructions may include the processor 402 performing one or more of the actions of the method 300 of FIG. 3.

The memory 404 and the file system 406 may include computer-readable storage media for carrying or having stored thereon computer-executable instructions or data structures. Such computer-readable storage media may be any available non-transitory media that may be accessed by a general-purpose or special-purpose computer, such as the processor 402. By way of example, and not limitation, such computer-readable storage media may include non-transitory computer-readable storage media including Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage media which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 402 to perform a certain operation or group of operations, such as one or more of the actions of the method 300 of FIG. 3. These computer-executable instructions may be included, for example, in the operating system 410, in one or more modules, such as the document sanitization module 108 of FIG. 1, or in some combination thereof.

The communication unit 408 may include any component, device, system, or combination thereof configured to transmit or receive information over a network, such as the network 102 of FIG. 1. In some embodiments, the communication unit 408 may communicate with other devices at other locations, the same location, or even other components within the same system. For example, the communication unit 408 may include a modem, a network card (wireless or wired), an infrared communication device, a wireless communication device (such as an antenna), and/or chipset (such as a Bluetooth device, an 802.6 device (e.g., Metropolitan Area Network (MAN)), a WiFi device, a WiMax device, a cellular communication device, etc.), and/or the like. The communication unit 408 may permit data to be exchanged with a network and/or any other devices or systems, such as those described in the present disclosure.

The operating system 410 may be configured to manage hardware and software resources of the computer system 400 and configured to provide common services for the computer system 400.

The user interface 412 may include any device configured to allow a user to interface with the computer system 400. For example, the user interface 412 may include a display, such as an LCD, LED, or other display, that is configured to present video, text, application user interfaces, and other data as directed by the processor 402. The user interface 412 may further include a mouse, a track pad, a keyboard, a touchscreen, volume controls, other buttons, a speaker, a microphone, a camera, any peripheral device, or other input or output device. The user interface 412 may receive input from a user and provide the input to the processor 402. Similarly, the user interface 412 may present output to a user.

The module 414 may be one or more computer-readable instructions stored on one or more non-transitory computer-readable media, such as the memory 404 or the file system 406, that, when executed by the processor 402, is configured to perform one or more of the actions of the method 300 of FIG. 3. In some embodiments, the module 414 may be part of the operating system 410 or may be part of an application of the computer system 400, or may be some combination thereof. In some embodiments, the module 414 may function as the document sanitization module 108 of FIG. 2

Modifications, additions, or omissions may be made to the computer system 400 without departing from the scope of the present disclosure. For example, although each is illustrated as a single component in FIG. 4, any of the components 402-414 of the computer system 400 may include multiple similar components that function collectively and are communicatively coupled. Further, although illustrated as a single computer system, it is understood that the computer system 400 may include multiple physical or virtual computer systems that are networked together, such as in a cloud computing environment, a multitenancy environment, or a virtualization environment.

As indicated above, the embodiments described herein may include the use of a special purpose or general purpose computer (e.g., the processor 402 of FIG. 4) including various computer hardware or software modules, as discussed in greater detail below. Further, as indicated above, embodiments described herein may be implemented using computer-readable media (e.g., the memory 404 or file system 406 of FIG. 4) for carrying or having computer-executable instructions or data structures stored thereon.

In some embodiments, the different components and modules described herein may be implemented as objects or processes that execute on a computing system (e.g., as separate threads). While some of the methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely example representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the summary, detailed description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

The foregoing description, for purpose of explanation, is described with reference to specific embodiments; however, the illustrative discussions above are not intended to be exhaustive or to limit the invention as claimed to the precise forms disclosed. Many modifications and variations are possible in view of the above teachings. The embodiments were chosen and described to explain practical applications, to thereby enable others skilled in the art to utilize the invention as claimed, and various embodiments with various modifications as may be suited to the particular use contemplated.

What is claimed is:

1. A computer-implemented method for electronic document sanitization, at least a portion of the method being performed by a computing device comprising one or more processors, the method comprising:
receiving a first request from a client device to send a first electronic document, the first request including a selected risk profile that includes a requested usability level of the first electronic document and determines how much of the first electronic document is sanitized before the first electronic document is sent to the client device;
determining a default malware risk level;
based at least in part on the first request, sanitizing at least one document object from the first electronic document at least until the default malware risk level is satisfied, the at least one document object having potentially malicious content; and
transmitting the first electronic document to the client device after-sanitizing the at least one document object therefrom.

2. The method of claim 1, wherein receiving the first request further comprises:
receiving a personalized risk profile related to the first electronic document, wherein the personalized risk profile defines a first desired malware risk level and the requested usability level.

3. The method of claim 2, further comprising:
receiving a second request from a client device to send a second electronic document, the second request including a second personalized risk profile related to the second electronic document, wherein the second personalized risk profile defines a second desired malware risk level and a second requested usability level.

4. The method of claim 1, wherein sanitizing the at least one document object further comprises:
sanitizing at least one default document object from the first electronic document, the at least one default document object being predetermined by an administrator.

5. The method of claim 1, wherein receiving the first request further comprises:
receiving a request to remove a specific type of document object from the first electronic document.

6. The method of claim 1, wherein sanitizing the at least one document object further comprises:
sanitizing at least one of a font, a script, an embedded object, a linkable object, or a combination thereof.

7. One or more non-transitory computer-readable media comprising one or more computer readable instructions that, when executed by one or more processors of a computing device, cause the computing device to perform a method for document sanitization, the method comprising:
receiving a first request from a client device to send a first electronic document, the first request including a selected risk profile that includes a requested usability level of the first electronic document and determines how much of the first electronic document is sanitized before the first electronic document is sent to the client device;
determining a default malware risk level;
based at least in part on the first request, sanitizing at least one document object from the first electronic document at least until the default malware risk level is satisfied, the at least one document object having potentially malicious content; and
transmitting the first electronic document to the client device after sanitizing the at least one document object.

8. The one or more non-transitory computer-readable media of claim 7, wherein receiving the first request further comprises:
receiving a personalized risk profile related to the first electronic document, wherein the personalized risk profile defines a first desired malware risk level and the requested usability level.

9. The one or more non-transitory computer-readable media of claim 8, further comprising:
  receiving a second request from a client device to send a second electronic document, the second request including a second personalized risk profile related to the second electronic document, wherein the second personalized risk profile defines a second desired malware risk level and a second requested usability level.

10. The one or more non-transitory computer-readable media of claim 7, wherein sanitizing the at least one document object further comprises:
  sanitizing at least one default document object from the first electronic document, the at least one default document object being predetermined by an administrator.

11. The one or more non-transitory computer-readable media of claim 7, wherein receiving the first request further comprises:
  receiving a request to remove a specific type of document object from the first electronic document.

12. The one or more non-transitory computer-readable media of claim 7, wherein sanitizing the at least one document object further comprises:
  sanitizing at least one of a font, a script, an embedded object, a linkable object, or a combination thereof.

\* \* \* \* \*